US010588310B2

United States Patent
Franks et al.

(10) Patent No.: US 10,588,310 B2
(45) Date of Patent: *Mar. 17, 2020

(54) HEATLESS AND CORDLESS FOGGING/MISTING APPARATUS HAVING A LOW CFM DC-POWERED BLOWER MOTOR AND A MIXING CHAMBER FOR ULTRA-LOW VOLUME ATOMIZED FOG

(71) Applicant: Boston Fog, LLC, Waltham, MA (US)

(72) Inventors: Barry Franks, Derry, NH (US); John Vallerand, Burlington, MA (US)

(73) Assignee: BOSTON FOG, LLC, Waltham, MA (US)

( * ) Notice: Subject to any disclaimer, the term of this patent is extended or adjusted under 35 U.S.C. 154(b) by 470 days.

This patent is subject to a terminal disclaimer.

(21) Appl. No.: 15/234,315

(22) Filed: Aug. 11, 2016

(65) Prior Publication Data
US 2016/0345573 A1    Dec. 1, 2016

Related U.S. Application Data (63) Continuation of application No. 14/099,319, filed on Dec. 6, 2013, now Pat. No. 9,414,580.
(Continued)

(51) Int. Cl.
*A01M 13/00* (2006.01)
*A01M 1/20* (2006.01)
(Continued)

(52) U.S. Cl.
CPC .......... *A01M 13/00* (2013.01); *A01M 1/2022* (2013.01); *A01M 1/2033* (2013.01);
(Continued)

(58) Field of Classification Search
CPC .............. B01F 3/04021; B01F 3/04042; B01F 3/04056; B01F 3/04063; A01M 7/0003;
(Continued)

(56) References Cited

U.S. PATENT DOCUMENTS 3,498,028 A    3/1970  Trouw ....................... 261/114.1
4,512,515 A    4/1985  Tenney ......................... 239/129
(Continued)

FOREIGN PATENT DOCUMENTS

GB          713406        8/1954   .......... A01M 7/0003
KR     20110135518       12/2011   .............. A01M 7/00
(Continued)

OTHER PUBLICATIONS

Hudson Fog Electric Atomizer Sprayer product page, http://www.hdhudson.com/product-search/product-details/?id=151, copyright 2011, accessed Jun. 26, 2015.*
(Continued)

*Primary Examiner* — Marc C Howell
(74) *Attorney, Agent, or Firm* — Hayes Soloway P.C.

(57) ABSTRACT

A portable fogger apparatus includes a portable fogger body having at least one airflow passageway. A DC blower motor is connected to the fogger body proximate to the airflow passageway and receives power from a battery, wherein the DC blower motor produces an airflow through the passageway. A mixing chamber is positioned along the at least one passageway, wherein at least a portion of the airflow is movable through the mixing chamber. A quantity of pressurized fogging liquid is housed within a container connected to the fogger body. The pressurized fogging liquid is dispensable from the container into the mixing chamber where it is expelled through a nozzle and mixed with the airflow to produce a fog. The fog has an atomized micron particulate size between 5 and 60 microns. An activation switch controls activation of the DC blower motor and/or dispensing of the pressurized fogging liquid.

12 Claims, 6 Drawing Sheets

Related U.S. Application Data (60) Provisional application No. 61/864,164, filed on Aug. 9, 2013.

(51) Int. Cl.
*B01F 3/04* (2006.01)
*B01F 15/02* (2006.01)

(52) U.S. Cl.
CPC ....... *A01M 1/2038* (2013.01); *B01F 3/04056* (2013.01); *B01F 15/0254* (2013.01)

(58) Field of Classification Search
CPC .............. A01M 7/0017; A01M 7/0021; A01M 1/2033; A01M 1/2038; A01M 1/2022
USPC ...................................... 366/167.1
See application file for complete search history.

(56) References Cited

U.S. PATENT DOCUMENTS

| | | | |
|---|---|---|---|
| 6,409,097 B1 | 6/2002 | McCauley | 239/289 |
| 6,837,447 B1 * | 1/2005 | Clark | A01M 7/0003 239/142 |
| 7,065,944 B1 | 6/2006 | Steele | 56/1 |
| 2004/0046052 A1 * | 3/2004 | Chang | B05B 9/0816 239/373 |
| 2008/0035758 A1 | 2/2008 | Muller et al. | 239/407 |
| 2009/0008473 A1 | 1/2009 | Yun | 239/85 |
| 2011/0197389 A1 * | 8/2011 | Ota | H02J 7/0045 15/339 |
| 2015/0043304 A1 | 2/2015 | Franks et al. | A01M 1/2022 |
| 2015/0082689 A1 | 3/2015 | Bertrand et al. | A01M 7/0017 |

FOREIGN PATENT DOCUMENTS

| | | |
|---|---|---|
| WO | WO2007039776 | 4/2007 |
| WO | WO-2007039776 A1 * | 4/2007 ........... A01M 7/0021 |

OTHER PUBLICATIONS

U.S. Appl. No. 14/099,319, filed Dec. 6, 2013.
International Preliminary Report on Patentability issued in application No. PCT/US2016/057199, dated Apr. 26, 2018 (7 pgs).
International Search Report and Written Opinion issued in application No. PCT/US2016/057199, dated Jan. 9, 2017 (7 pgs).
Hudson Professional Division product manual for models 99598 and 99599, H.D. Hudson Manufacturing Company, 2012.

* cited by examiner

HEATLESS AND CORDLESS FOGGING/MISTING APPARATUS HAVING A LOW CFM DC-POWERED BLOWER MOTOR AND A MIXING CHAMBER FOR ULTRA-LOW VOLUME ATOMIZED FOG

CROSS REFERENCE TO RELATED APPLICATION

This application is a continuation of U.S. application Ser. No. 14/099,319 entitled, "Heatless and Cordless Fogging/Misting Apparatus having a Low CFM DC-Powered Blower Motor and a Mixing Chamber for Ultra-Low Volume Atomized Fog" filed Dec. 6, 2013, now U.S. Pat. No. 9,414,580 issued Aug. 16, 2016, which claims benefit of U.S. Provisional Application Ser. No. 61/864,164 entitled, "Fogging/Misting Apparatus Having a Low CFM DC-Powered Blower Motor and a Mixing Chamber for Ultra-Low Volume Atomized Fog" filed Aug. 9, 2013, the entire disclosures of which are incorporated herein by reference.

FIELD OF THE DISCLOSURE

The present disclosure is generally related to mixing chambers and more particularly is related to a cordless and heatless fogging apparatus having a low CFM DC-powered blower motor and a pressurized liquid tank and a specially designed mixing chamber for ultra-low volume atomized fog.

BACKGROUND OF THE DISCLOSURE

A fogger is a device that creates a fog or mist or small particulate size typically converted from a fluid, such as an insecticide for killing insects and other biological material. Foggers are often used by consumers and professional pest control services, but may also be used for other purposes, such as sanitization. Within the industry, there are two main choices for fogging tools: (1) a thermal fogger; and (2) a cold fogger, either an electric-corded fogger or gasoline powered motor fogger. Both of these foggers have significant drawbacks.

The thermal fogger uses heat to create a fog with small particle sizes—often too small—and do not actively stick to the insect target, but deter them. The insect will fly away upon application of the fog and return when the fog clears out. Additionally, the thermal fog clouds produced can remain suspended within the air and travel to areas which were not intended to receive treatment, such as neighboring yards, water areas and other non-targeted areas. Beyond producing a small particle size, thermal foggers present many problems with their use. They require a liquid or gas fuel source, commonly propane, which can be dangerous in many settings, such as around open flames. Thermal foggers also create significant amounts of heat which can cause burning injuries to the operator. Additionally, thermal foggers are cumbersome and difficult to use in confined areas, such as attics.

Figure 1:
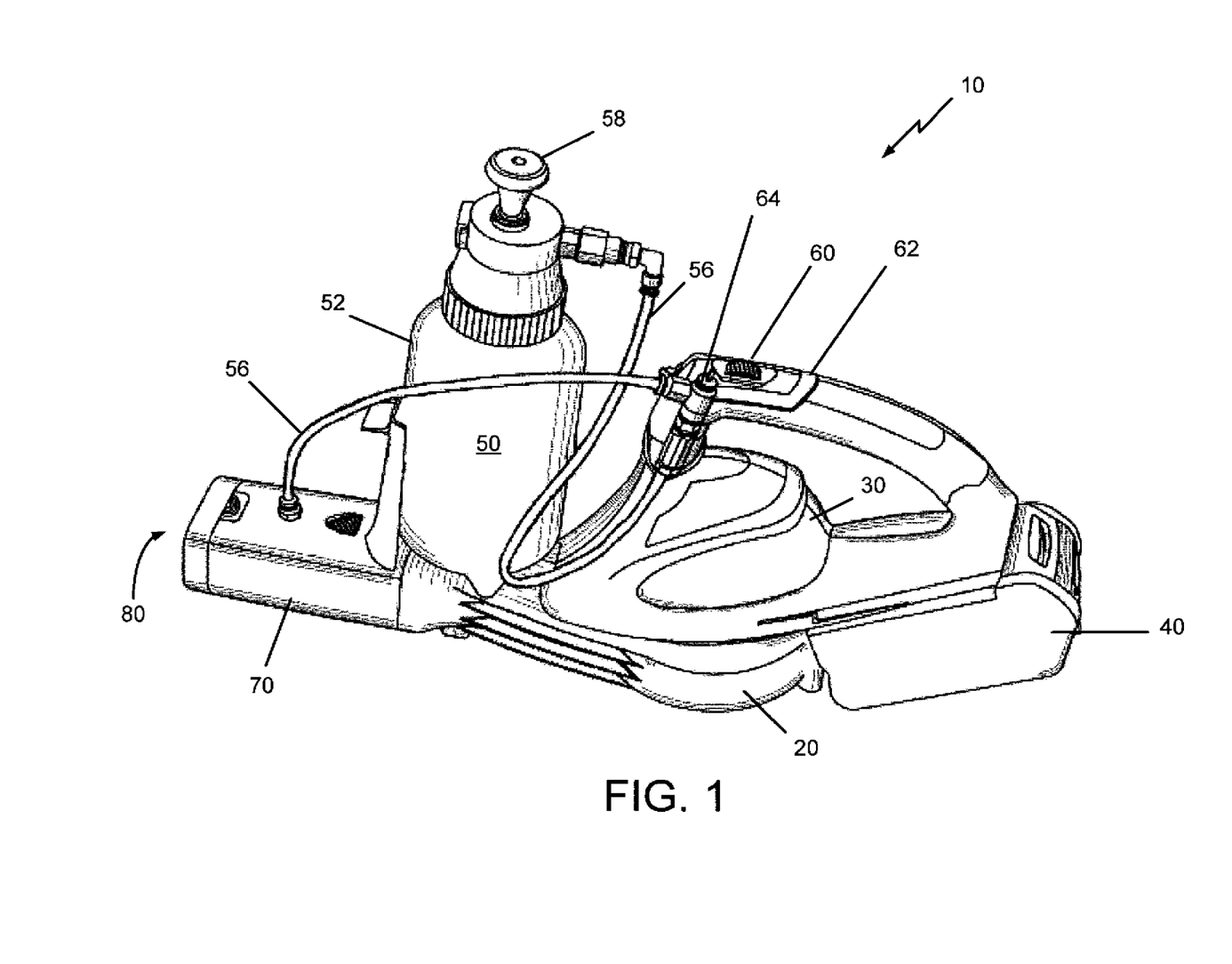
Figure 2:
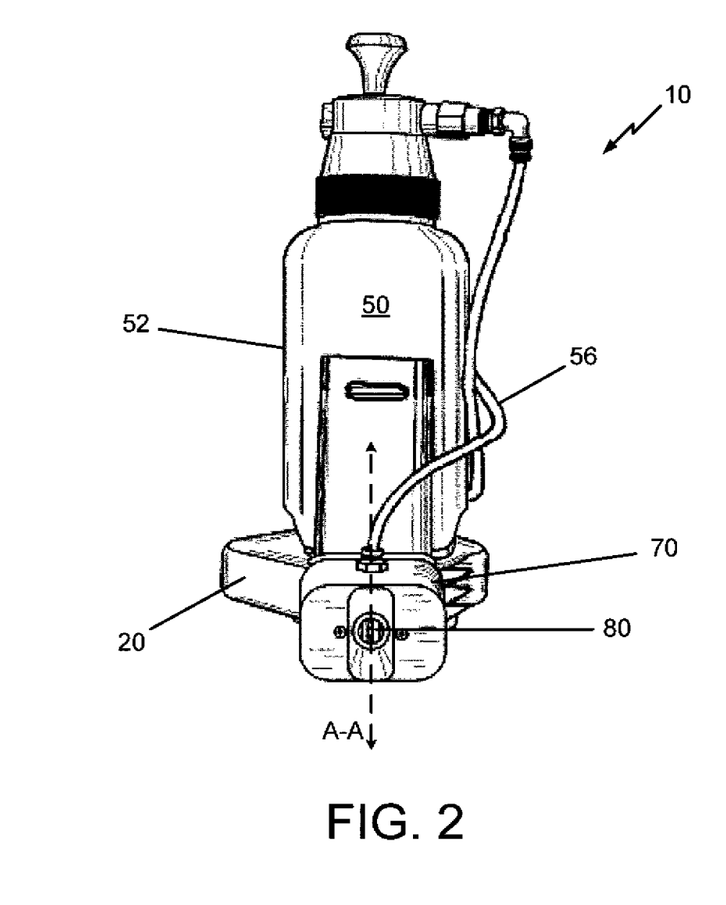
Figure 3:
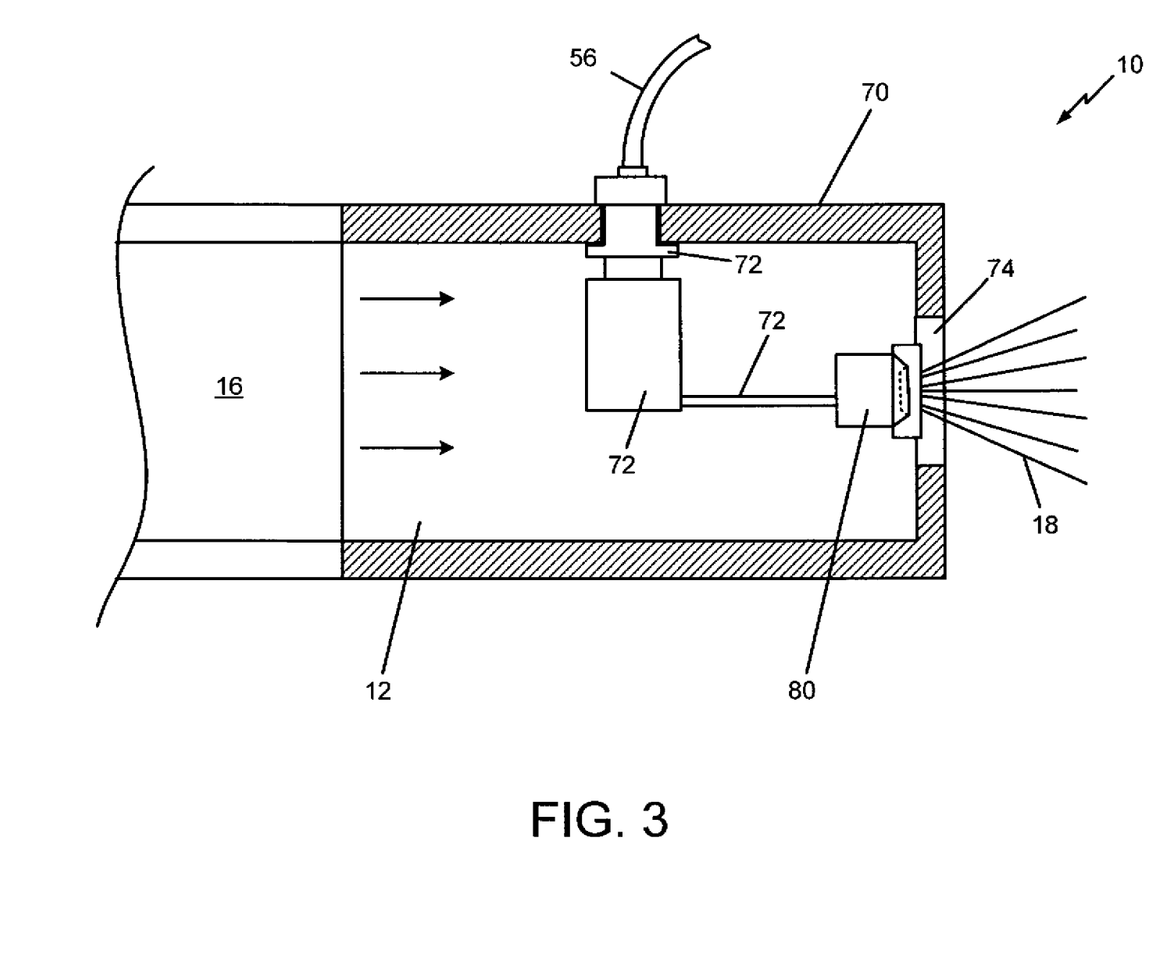
Figure 4:
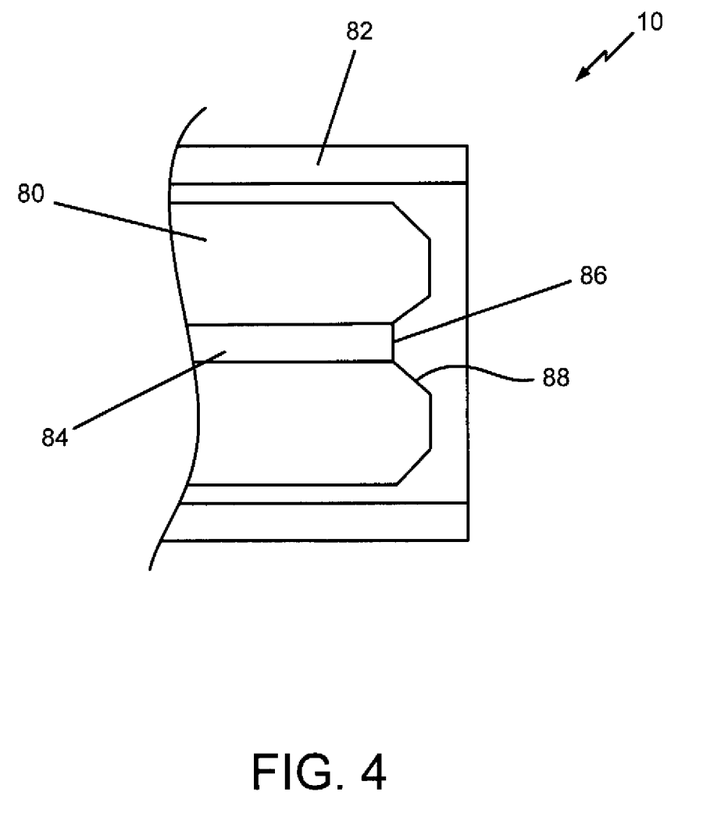
Figure 5:
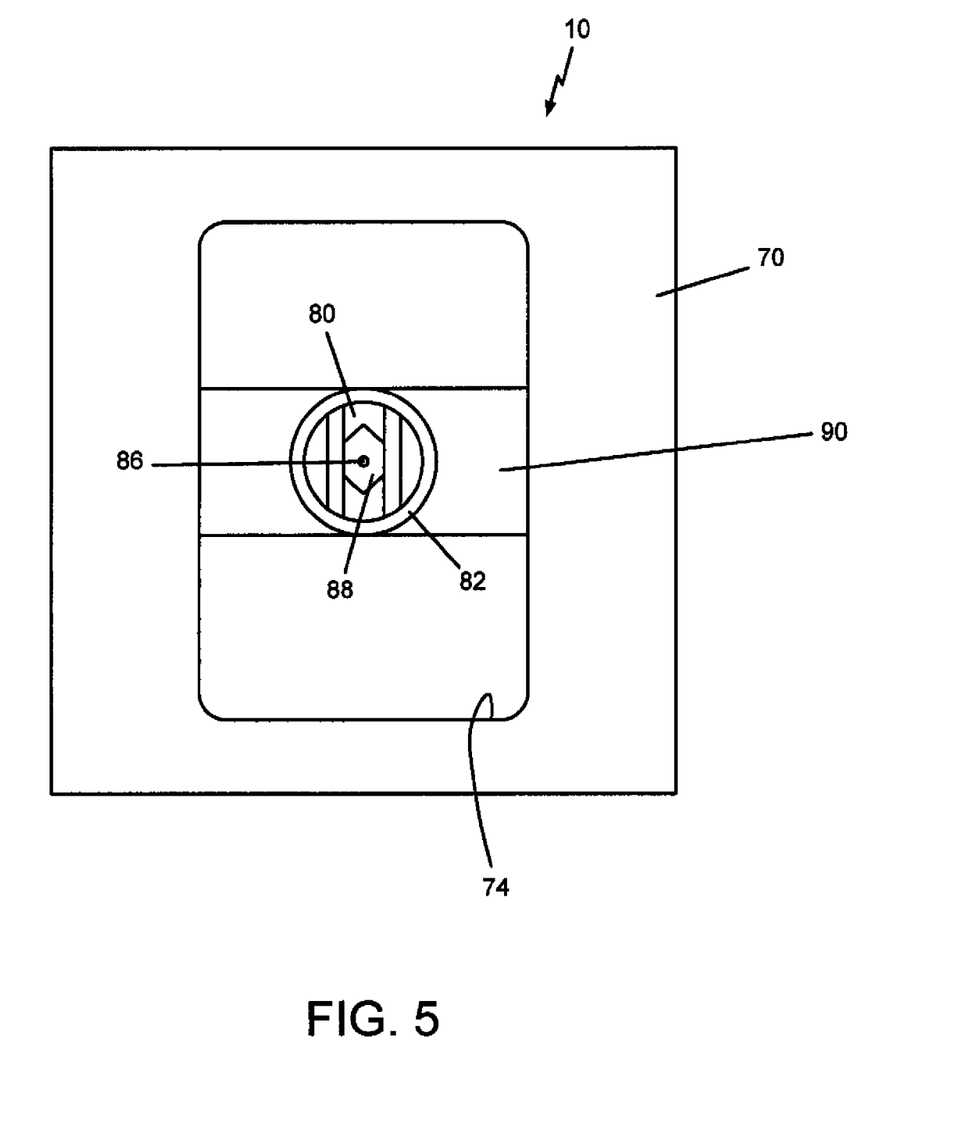

Electric-corded foggers do not use heat and produce a cold fog, which is comprised of droplet sizes averaging fewer than 25 microns. This size is the optimal size for killing the targeted insect or microorganisms. However, electric-corded foggers are limited to only AC power and therefore, they are limited to the being used only where an AC power cord can reach. Conventional electric-corded AC foggers and gasoline motor driven cold foggers, both of which are known as cold foggers, operate by creating high CFM airflow through the nozzle which siphons the liquid from a tank. These units produce higher CFM's by reducing the end orifice size to generally less than 1 inch in diameter. The AC blower motors which are generally 10 amps or greater and between 110 v to 220 v offer the blower motor 1,100 watts to 2,200 watts to power the blower motor and push the air through the reduced orifice. They use high cubic foot per minute (CFM) volume generation, above 190 CFM and often upwards of 600 CFM. They also have high air speeds generated by the AC blower motor to produce high pressure air which is channeled through a vortex or turbine. As the high pressured air passes the liquid jet, the air siphons the liquid from the liquid and creates atomized particles. These conditions cannot be achieved with cordless foggers.

Thus, a heretofore unaddressed need exists in the industry to address the aforementioned deficiencies and inadequacies.

SUMMARY OF THE DISCLOSURE

Embodiments of the present disclosure provide a portable fog generating apparatus and related methods. Briefly described, in architecture, one embodiment of the apparatus, among others, can be implemented as follows. The portable fog generating apparatus includes a portable fogger body having at least one airflow passageway. At least one battery is positioned on the portable fogger body. A DC blower motor is connected to the portable fogger body proximate to the at least one airflow passageway and receives power from the at least one battery, wherein the DC blower motor produces an airflow through the at least one passageway. A mixing chamber is positioned along the at least one passageway, wherein at least a portion of the airflow is movable through the mixing chamber. A quantity of pressurized fogging liquid is housed within a container connected to the portable fogger body, wherein at least a portion of the quantity of pressurized fogging liquid is dispensable from the container into the mixing chamber, wherein the dispensed portion of the quantity of pressurized fogging liquid is expelled through a nozzle and mixed with the airflow to produce a fog, wherein the fog has an atomized micron particulate size between 5 and 60 microns. An activation switch controls at least one of activation of the DC blower motor and dispensing of the portion of the quantity of pressurized fogging liquid.

The present disclosure can also be viewed as providing methods of generating a low-CFM fog with a portable, battery-powered fogging apparatus. In this regard, one embodiment of such a method, among others, can be broadly summarized by the following steps: initiating an airflow through at least one passageway of the portable, battery-powered fogging unit with a DC powered blower motor receiving power from at least one battery; expelling a quantity of pressurized fogging liquid through a nozzle positioned proximate to an opening within a mixing chamber, wherein the quantity of pressurized fogging liquid exits the nozzle at an atomized micron particulate size between 5 and 60 microns; and atomizing the expelled quantity of pressurized fogging liquid with the airflow to produce a fog at 190 CFM and at a velocity of less than 190 MPH.

The present disclosure can also be viewed as providing cordless, portable fogger/misting device. Briefly described, in architecture, one embodiment of the device, among others, can be implemented as follows. A portable fogger body has at least one airflow passageway. At least one battery is positioned on the portable fogger body. A DC blower motor is contained within the portable fogger body and position abutting the at least one airflow passageway, wherein the DC blower motor receives power solely from the at least one battery, wherein the DC blower motor produces an airflow through the at least one passageway. A mixing chamber is positioned along the at least one passageway, wherein the airflow is movable through the mixing chamber. A nozzle is positioned within the mixing chamber in a location proximate to an opening of the mixing chamber. A quantity of pressurized fogging liquid is housed within a container connected to the portable fogger body, wherein at least a portion of the quantity of pressurized fogging liquid is dispensable from the container into the mixing chamber, wherein the dispensed portion of the quantity of pressurized fogging liquid is expelled through a nozzle and mixed with the airflow to produce a fog without the use of heat, wherein the fog has an atomized micron particulate size between 5 and 60 microns, wherein the fog exits the mixing chamber at less than 190 CFM and at a velocity of less than 190 MPH. An activation switch controls at least one of activation of the DC blower motor and dispensing of the portion of the quantity of pressurized fogging liquid.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a side view illustration of a fogger apparatus, in accordance with a first exemplary embodiment of the present disclosure.

FIG. 2 is a front view illustration of a fogger apparatus of FIG. 1, in accordance with a first exemplary embodiment of the present disclosure.

FIG. 3 is a cross-sectional view illustration of a mixing chamber of the fogger apparatus of FIG. 2 along the line A-A, in accordance with a first exemplary embodiment of the present disclosure.

FIG. 4 is a cross-sectional top view illustration of a nozzle of the fogger apparatus of FIG. 1, in accordance with a first exemplary embodiment of the present disclosure.

FIG. 5 is a front view illustration of the nozzle of the fogger apparatus of FIG. 1, in accordance with a first exemplary embodiment of the present disclosure.

FIG. 6 is a flowchart illustrating a method of generating a low-CFM fog with a portable, battery-powered fogging apparatus in accordance with a second exemplary embodiment of the disclosure.

DETAILED DESCRIPTION

FIG. 1 is a side view illustration of a fogger apparatus 10, in accordance with a first exemplary embodiment of the present disclosure. The fogger apparatus 10, which may be referred to herein as 'apparatus 10' includes a portable fogger body 20 having at least one airflow passage. At least one battery 40 is positioned on the portable fogger body 20. A DC blower motor 30 is connected to the portable fogger body 20 proximate to the at least one airflow passage and receives power from the at least one battery 40, wherein the DC blower motor 30 produces an airflow through the at least one passageway. A mixing chamber 70 is positioned along the at least one passageway, wherein at least a portion of the airflow is movable through the mixing chamber 70. A quantity of pressurized fogging liquid 50 is housed within a container 52 connected to the portable fogger body 20, wherein at least a portion of the quantity of fogging liquid 50 is dispensable from the container 52 into the mixing chamber 70. The dispensed portion of the quantity of pressurized fogging liquid is expelled through a nozzle 80 and mixed with the airflow to produce a fog, wherein the fog has an atomized particulate size between 5 and 60 microns. An activation switch 60 controls at least one of activation of the DC blower motor 30 and dispensing of the portion of the quantity of fogging liquid 50.

The apparatus 10 is a portable, compact, light-weight fogging unit preferably constructed primarily of plastic, which does not rely on an electric power cord or gas/propane to operate. Rather, the apparatus utilizes a battery 40 to power a DC blower motor 30 to create a fog and/or mist to combat insects and other biological material. As discussed in the Background, conventional foggers use either heat or a corded-electric AC motor to create fog. The apparatus 10 is portable in that it can operate fully on battery-power and can be transported relatively easily without the inefficiencies of an electric cord. The apparatus 10 also uses no heat, heat source, or other thermal modification to create the fog. The apparatus 10 may be used within any industry or market, including those directed to pest control, bio control, microbial, medical, or other industries.

The portable fogger body 20 may be a structure that houses the various components of the apparatus 10. The portable fogger body 20 may be constructed from plastics, metals, or another material. When coupled with the DC blower motor 30, positioned on the portable fogger body 20, and powered with one or more batteries 40, the apparatus 10 is fully portable and can be moved into a variety of locations and settings, irrespective of corded-power accessibility. As is shown in FIG. 1, the DC blower motor 30 may be integrally formed on the body 20 and the battery 40 may be removably from the body 20, thereby allowing it to be recharged when the apparatus 10 is not in used.

The DC blower motor 30 operates with only direct-current (DC) power, and does not use alternating-current (AC) power. The battery 40 provides the DC power source to the DC blower motor 30, thereby allowing the DC blower motor 30 to produce airflow. The battery 40 may include a 6 volt to 50 volt DC battery. The airflow may traverse through one or more passageways within the portable fogger body 20, such as a passageway that connects the DC blower motor 30 with the mixing chamber 70. In FIG. 1, the passageway is internal of the portable fogger body 20 and generally defined by the various structures that comprise the portable fogger body 20.

A quantity of fogging liquid 50 is housed within a container 52 positioned on the portable fogger body 20. The fogging liquid 50 may be any type of liquid used with fogging, such as hydrogen peroxide, or other commonly-used chemicals. The container 52 may be positioned on the portable fogger body 20 such that it is removably retained to the body 20 with a retaining mechanism. In other embodiments, it is possible for the container 52 to be positioned remote from the portable fogger body 20, such as on the back of the user of the apparatus 10. All positions of the container 52 relative to the portable fogger body 20 are considered within the scope of the present disclosure, so long as the container 52 is in fluid connection with the portable fogger body 20. The container 52 may be connected to the portable fogger body 20 or other components with a plurality of tubes 56 which can carrying the dispensed portion of the fogging liquid 50. As is shown in FIG. 1, the tubes 56 may connect the container 52 with the activation switch 60 and the activation switch 60 to the mixing chamber 70. Any number of tubes 56 and/or other fogging liquid transportation structures may be used with the apparatus 10. As will be discussed further herein, the fogging liquid 50 may be pressurized.

An activation switch 60 controls activation of the DC blower motor 30 and/or dispensing of the portion of the quantity of fogging liquid 50. The activation switch 60 may include one or more switches, operated concurrently or independently. For example, as is shown in FIG. 1, a first switch 62 may control activation of the DC blower motor 30 while a second switch 64, such as a shut off valve, controls flow of the fogging liquid 50. The two switches 62, 64 may be combined as one. When in use, the operator of the apparatus 10 may conveniently activate the first or second switch 62, 64 to provide proper application of the fog.

A mixing chamber 70 may be positioned at an end of the portable fogger body 20. The mixing chamber 70, described further in detail relative to FIGS. 2-5, receives the airflow from the DC blower motor 30 and the dispensed portion of the quantity of fogging liquid 50. A nozzle 80 within the mixing chamber 70 may combine the airflow and the dispensed portion of the fogging liquid 50 to provide optimal fog, i.e., fog that has the optimal particulate size, optimal throw distance, and optimal spray angle. The fog is created from the combination of the airflow past the nozzle 80 and the dispensed portion of the quantity of fogging liquid 50 being expelled through the nozzle 80. While optimal particulate size may vary, in accordance with this disclosure, particulate size can be between 5-60 microns. For specific applications, such as with mosquito fogging, optimal particulate size of the fog created by the apparatus 10 is at least 90% under 20-25 microns, with 100% under 20-25 microns being most preferable.

FIG. 2 is a front view illustration of a fogger apparatus 10 of FIG. 1, in accordance with a first exemplary embodiment of the present disclosure. As can be seen in FIG. 2, one or more fluid transporting structures, such as tubes, may be used to transport the pressurized fogging liquid 50. For example, the tube 56 carrying the dispensed portion of the fogging liquid 50 may be connected to the mixing chamber 70. The tube 56 may traverse through the mixing chamber 70 and connected to the nozzle 80, which is located fully or substantially fully within the mixing chamber 70. The airflow created by the DC blower motor 30 (FIG. 1), may traverse through the lower portion of the portable fogger body 20 and into the mixing chamber 70. The mixing chamber 70 and the nozzle 80 are discussed in detail relative to FIGS. 3-5. It is noted that the container 52 may be positioned on the portable fogger body 20 such that the pressurized fogging liquid 50 can be delivered directly to the nozzle 80 by using a single fluid transporting structure, such as a valve.

FIG. 3 is a cross-sectional view illustration of a mixing chamber 70 of the fogger apparatus 10 of FIG. 2 along the line A-A, in accordance with a first exemplary embodiment of the present disclosure. As is shown in FIG. 3, the airflow, which is generally identified by arrows 12, may enter one side of the mixing chamber 70 from the airflow passageway 16. The airflow 12 passes by the nozzle 80 and exits the mixing chamber 70 via the opening 74. Concurrently, the tube 56 provides the dispensed portion of the fogging liquid 50 (FIGS. 1-2) into the mixing chamber 70 via a variety of connectors 72, which facilitate transportation of the dispensed portion of the fogging liquid 50 along with the tubes 56. The nozzle 80 receives the dispensed portion of the fogging liquid 50 and expels it proximate to the opening 74. As soon as the dispensed portion of the fogging liquid 50 is expelled, it is mixed with the airflow 12 to create fog 18.

The nozzle 80 may be positioned a specific distance away from the opening 74 to provide optimal spray of the dispensed portion of the fogging liquid 50 without subjecting the nozzle 80 to the hazardous of operating the apparatus 10, such as inadvertently contacting the nozzle 80 and damaging it. For example, the nozzle 80 may be positioned one inch or less from the opening 74. The position of the nozzle 80 relative to the opening 74, along with the angle of the nozzle 80 and the pressure of the dispensed portion of the fogging liquid 50 may provide for optimal throw distances of the fog 18. For example, the apparatus 10 may achieve initial throw distances of 25 feet or more and subsequent distance due to the continual ejection of the fog 18.

FIG. 4 is a cross-sectional top view illustration of a nozzle 80 of the fogger apparatus 10 of FIG. 1, in accordance with a first exemplary embodiment of the present disclosure. The nozzle 80 may include an outer housing 82 which is surrounding the nozzle 80. The nozzle 80 includes a fluid path 84 terminating in an orifice 86, positioned at the end of the nozzle 80. Proximate to the orifice 86, the nozzle 80 may include angled sides 88 which direct the spray of the dispensed portion of the fogging liquid 50 that exits the orifice 86. These structures of the nozzle 80 may create a breakdown of the dispensed portion of the fogging liquid 50 forced through the nozzle 80. For example, the angled sides 88 may control the breakdown shape of the spray, whether it is a fan, a flat, a cone, or another shape. While these are good nozzle patterns which can break down and scatter the dispensed portion of the fogging liquid 50, others may be used too. The nozzle 80 may require a 10°-85° (ten to eighty-five degree) opening and an orifice size less than 0.05 (fifty thousandths) of an inch. A materially larger orifice size may result in too large of a spray of the dispensed portion of the fogging liquid 50 to atomize properly.

FIG. 5 is a front view illustration of the nozzle 80 of the fogger apparatus 10 of FIG. 1, in accordance with a first exemplary embodiment of the present disclosure. As can be seen in FIG. 5, the nozzle 80 may be supported within the mixing chamber 70 with a fastening member 90 that is connected to the mixing chamber 70 and the nozzle 80. The fastening member 90 may contact or surround any portion of the nozzle 80 and may be adept at protecting the nozzle from damage. The fastening member 90 may also connect to the mixing chamber 70 via any means, such as threaded fasteners, adhesives, or others. Additionally, as is shown in FIG. 5, the shape of the spray from the nozzle 80 may be orientated to substantially match a shape of the opening 74 of the mixing chamber 70. For example, in FIG. 5, the spray may be shaped to match the generally elongated height of the opening 74. Depending on the desired use of the apparatus 10, the shape and/or direction of the nozzle 80 and opening 74 may be changed.

Relative to FIGS. 1-5, the fogging liquid 50 may be pressurized to provide proper dispensing of the fogging liquid 50 to the mixing chamber 70. While a variety of pressures of the fogging liquid 50 may be acceptable, it may be beneficial to have a fogging liquid 50 that is less than 50 PSI. Pressurization of the fogging liquid 50 may be achieved via manual means, such as a pressurizing valve 58 (FIG. 1) on the top of the container 52, or via automatic means, such as by automatically pressurizing the container 52 with the DC blower motor 30 when it is activated.

The pressurized fogging liquid 50 when ejected from the apparatus 10 within the nozzle 80 is atomized because the particles are small and manageable, allowing for proper mixing of the dispersed micron droplets when exposed to the passing air from the low CFM DC blower motor 30. This combination results in atomized droplets of the fogging liquid 50 with particle micron sizes ninety percent (90%) below twenty-five (25) microns. A large, fifty thousandths of an inch orifice 86 size may create very large micron(s) sizes which may be suitable for wet application of bio threats, but for flying insects the application of an eleven-thousandths (0.011 inch) sized orifice 86 to a twenty-eight thousandths (0.028 inch) sized orifice 86 is ideal. Depending on the intended use of the apparatus 10, the size of the orifice 86 and the particle size may vary.

When manual means are used to pressurize the fogging liquid 50, a pressurized bottle or tank may be used as the container 52. When manually activated by priming, pumping, or trigger action, the pumping mechanism will disperse fogging liquid 50 no greater than fifty PSI into the nozzle 80 of the mixing chamber 70, where the internals of the nozzle 80 break the particle sizes down and ejected particles atomize with the low CFM air produced by the DC blower motor 30.

Flow of the pressurized fogging liquid 50 from the container 52 may be controlled with the activation switch 60, a shut off valve for safety, and/or a liquid trigger through the tube 56. The pressurized fogging liquid 50 may travel within the tube 56 and into the nozzle 80, which is center mounted in the mixing chamber 70. The pressurized fogging liquid 50 dispensed through the nozzle 80 may be broken down by the nozzle 80 as a fan, cone, flat, spray jet, or other shape with a 10°-85° degree opening and an orifice size smaller than 0.05 inches. As the broken-down liquid particles eject from nozzle 80, they will atomize with the airflow 12 and then exit the opening 74 of the mixing chamber 70. It is noted that if the opening 74 of the mixing chamber 70 is smaller than the mixing chamber 70, the air and fogging liquid 50 will be compressed through the opening 74 and forced to atomize. Accordingly, it may be preferable for the opening 74 to be sized smaller than the cross-sectional dimension, e.g., height and width, of the mixing chamber 70.

In use, the DC-powered blower motor 30, which is powered by a DC battery 40, may be activated via switch 60 to activate the DC blower motor 30. Then, the container 52 may be pumped with the manual pump via the top pump. The pressurized fogging liquid 50 is released from the container 52 and travels through the tubes 56, past a flow control valve (second switch 64), and into the mixing chamber 70. The dispensed portion of the fogging liquid 50 is ejected from the nozzle 80 as small, broken-down particles, which atomize with the forced air prior to exiting the opening 74 of the mixing chamber 70 to create small particle, ultra-low volume fog or mist.

When an automatic liquid pressure system is used, it may be powered by the DC blower motor 30 and/or the battery 40. In this design the DC blower motor 30 may electrically operate an automatic liquid pumping device located in or near the container 52. A tube 56 transports the pressurized source to control the liquid to the nozzle 80, controlled by a shut off valve for safety or a liquid trigger. The pressurized fogging liquid may travel the tube 56 exit the nozzle 80 as described relative to the manual pressurization example.

As will be discussed herein, the apparatus 10 may provide significant benefits with fogging or misting insects or other biological material in tight spaces, such as attics, or in remote locations where corded-power is not readily available. Furthermore, the apparatus 10 provides significant benefits over thermal foggers, which have many drawbacks. For one, the apparatus 10 does not require heat or a propane or gas fuel. Secondly, the apparatus 10 will have less of a tendency to contaminate non-intended areas with fog, since it can produce particulate at the optimal size of approximately 25 microns, whereas thermal foggers produce particulate at smaller sizes which tend to easily spread to non-intended application areas.

Conventional AC corded-power foggers typically produce more than 190 CFM and wind speeds of greater than 190 MPH. These AC powered units or gasoline driven motorized units produce higher CFM's by reducing the end orifice size generally to under 1 inch in diameter. The AC blower motors which are generally 10 amps or greater and between 110 v to 220 v offer the blower motor 1,100 watts to 2,200 watts to power the blower motor and push the air through the reduced orifice. This creates a nozzle/orifice with greater CFM which is needed for conventional cold fog systems.

DC blower motors powered with a battery generally operate with a total power source less than 160 watts. This restriction in power may cause the conventional DC blower motor to lose CFM pressure at a smaller orifice end and actually create back pressure. The apparatus 10 may use a mixing chamber 70 opening 74 (commonly referred to as an 'end orifice' within the industry) of 1 inch by 2 inches to negate the negative effects of back pressure and prevent damage to the motor. Testing has shown that the opening 74 may be sized ¾ inch or larger and still produce successful results, preferably ⅞ of an inch or larger for less powerful DC blower motors. The shape of the opening 74 may be oval, circular, or other similar shapes. With these restrictions understood, the apparatus 10 may be limited to producing 190 CFM's and a total wind velocity of 190 MPH or less. Conventional AC blower motors and blower motors powered by gasoline highly exceed these low CFM and low wind speeds, by over powering the unit by reducing the orifice size creating such high powered wind velocity and CFM's through the vortex or turbine that the air passing by the liquid nozzle/jet creates suction and pulls liquid from the tank and suctioned liquid exits the jet and is atomized when dispersed into the surrounding high powered air stream.

Any of the existing cold fog nozzles, turbines or mixing chambers will simply not work with the low pressure and CFM created by the less powerful and low wattage DC blower motors. Specifically, low powered CFM blower motors producing less than 190 MPH wind speeds and less than 190 CFMs cannot create the siphoning effect from the low pressure of air passing through the vortex/turbine. If pressurized stream is introduced to the jet while the blower motor is forcing its low air pressure through the channel, the liquid will exit the chamber without being atomized, misted or fogged. The stream, even when introduced at low liquid pressure, will bypass the forced air and simply not atomize.

TESTING EXAMPLE

Brushless DC motors are currently available at a significantly reduced price. Our commercial vortex and turbine from our AC high CFM fogging device were installed to the new brushless motor. We then attached a vented liquid tank, with a hose connected to the chamber nozzle connected to the vortex and turbine. In short, we attached and assembled the nozzle and tank to the DC brushless motor with air speeds of 190 mph, the assembly was identical to our AC high CFM 1,000 watt plus unit. The nozzle we used is typical in all AC units measuring less than an inch in orifice size. We then turned the unit on and there was an immediate problem, there was no fog or atomization the liquid ejected from the nozzle without being atomized. There was also a massive amount of air being pushed backwards through the brushless DC impeller (back flow), as discussed previously herein, proving to us that even with the most advanced brushless DC motors in the industry, fogging may not possible with a low cost consumer grade DC motor with power less than 240 watts compared to the extreme high powered watts AC systems.

We then further tested this new brushless DC technology. We installed our mixing chamber and tank system to the 240 watt DC brushless DC device. When the unit was powered on atomized particles were ejected from the orifice in perfect sized Ultra low Volume particle sizes, also there was no back pressure and the system operated in perfect harmony.

This testing concluded our design as the new technology which corrects a problem, not only with the older existing DC blower motors which offered smaller batteries and less amperage example 12 v 2 amp (24 watts) but can correct the newer higher watts and higher velocity units ex brushless blower with 40 v 6 amps 240 watts.

Figure 6:
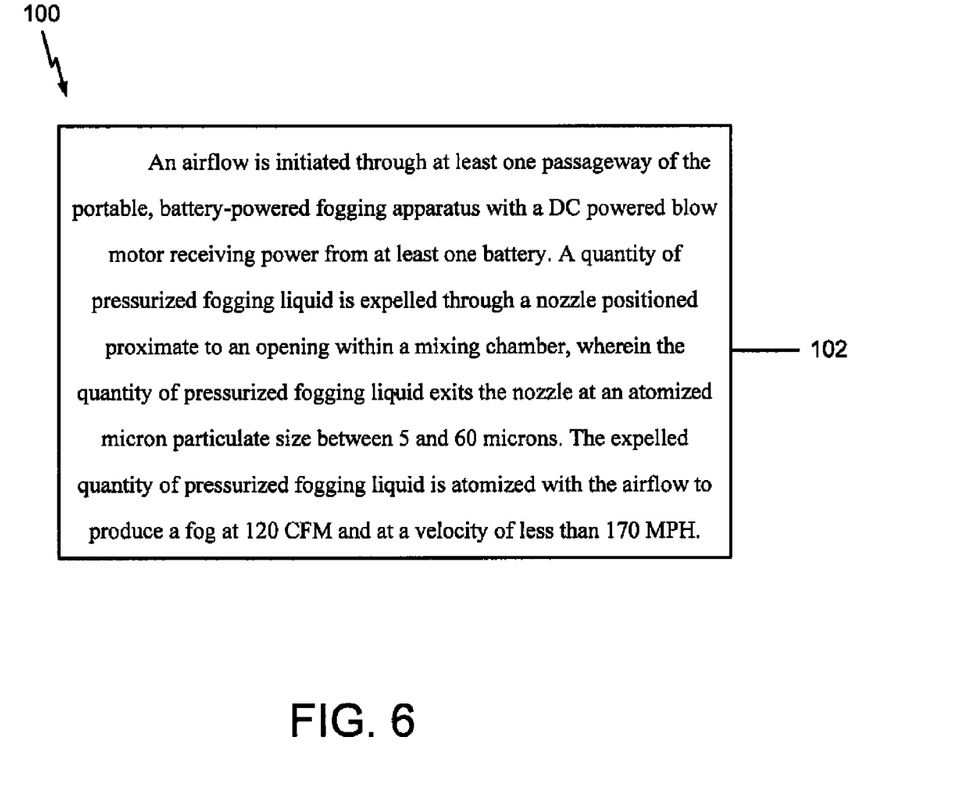

FIG. 6 is a flowchart 100 illustrating a method of generating a low-CFM fog with a portable, battery-powered fogging apparatus in accordance with a second exemplary embodiment of the disclosure. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, an airflow is initiated through at least one passageway of the portable, battery-powered fogging apparatus with a DC powered blower motor receiving power from at least one battery. A quantity of pressurized fogging liquid is expelled through a nozzle positioned proximate to an opening within a mixing chamber, wherein the quantity of pressurized fogging liquid exits the nozzle at an atomized micron particulate size between 5 and 60 microns. The expelled quantity of pressurized fogging liquid is atomized with the airflow to produce a fog at or below 190 CFM and at a velocity of less than 190 MPH at an opening size of ¾ inch or greater.

The method may include any additional number of steps or variations thereof, including any of the processes, functions, or structures disclosed within this disclosure. For example, activation of the DC blower motor and/or expelling of the portion of the quantity of pressurized fogging liquid may be controlled with at least one activation switch. The nozzle may be positioned a predetermined distance from an opening of the mixing chamber, such as less than one inch from the opening. When the quantity of pressurized fogging liquid is atomized with the airflow, it is done without the use of a heat source and solely with the at least one battery. Either manual or automatic means may be used to pressurize the fogging liquid within a container housing the pressurized fogging liquid.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claim.

What is claimed is:

1. A portable fog generating apparatus comprising:
a portable fogger body having at least one airflow passageway;
a single battery positioned on the portable fogger body, the single battery providing a total power source of less than 160 watts;
a DC blower motor connected to the portable fogger body proximate to the at least one airflow passageway and receiving power from the single battery, wherein the DC blower motor produces an airflow through the at least one passageway using the less than 160 watts supplied by the single battery;
a mixing chamber positioned along the at least one passageway, wherein at least a portion of the airflow is movable through the mixing chamber;
a quantity of pressurized fogging liquid housed within a container connected to the portable fogger body, wherein at least a portion of the quantity of pressurized fogging liquid is dispensable from the container into the mixing chamber;
an activation switch controlling at least one of activation of the DC blower motor and dispensing of the portion of the quantity of pressurized fogging liquid; and
a fog, produced when the dispensed portion of the quantity of pressurized fogging liquid is expelled through a nozzle and mixed with the airflow wherein at least 90% of atomized micron particulate of the fog is smaller than 25 microns, wherein the fog exits the mixing chamber at less than 190 CFM and at a velocity of less than 190 MPH.

2. The fog generating apparatus of claim 1, further comprising a pressure valve positioned within the container, wherein actuation of the pressure valve pressurizes the quantity of fogging liquid within the container.

3. The fog generating apparatus of claim 1, wherein the quantity of pressurized fogging liquid is pressurized within the container automatically upon activation of the activation switch.

4. The fog generating apparatus of claim 1, further comprising at least one fluid transporting structure connected between the container and the mixing chamber.

5. The fog generating apparatus of claim 4, wherein the at least one fluid transporting structure further comprises a first fluid transporting tube connected between the container and the activation switch and a second fluid transporting tube connected between the activation switch and the mixing chamber.

6. The fog generating apparatus of claim 1, further comprising an opening within the mixing chamber, wherein the nozzle is positioned a predetermined distance from the opening.

7. The fog generating apparatus of claim 6, wherein the opening of the mixing chamber is sized smaller than a cross-sectional size of the mixing chamber.

8. The fog generating apparatus of claim 6, wherein the nozzle is positioned less than one inch from the opening.

9. The fog generating apparatus of claim 1, wherein the nozzle further comprises a fluid path terminating at an orifice, wherein the orifice further comprises at least two angled sides.

10. The fog generating apparatus of claim 1, further comprising an outer housing positioned around the nozzle.

11. The fog generating apparatus of claim 10, further comprising a fastening member connected between at least one of the outer housing and the nozzle and a wall of the mixing chamber, wherein the fastening member holds the nozzle in a substantially stationary, predetermined position relative to an opening formed within the mixing chamber.

12. A cordless, portable fogger/misting device comprising:
- a portable fogger body having at least one airflow passageway;
- a single battery positioned on the portable fogger body, the single battery providing a total power source of less than 160 watts;
- a DC blower motor contained within the portable fogger body and positioned abutting the at least one airflow passageway, wherein the DC blower motor receives power solely from the single battery, wherein the DC blower motor produces an airflow through the at least one passageway using less than 160 watts supplied by the single battery;
- a mixing chamber positioned along the at least one passageway, wherein the airflow is movable through the mixing chamber;
- a nozzle positioned within the mixing chamber in a location proximate to an opening of the mixing chamber;
- a quantity of pressurized fogging liquid housed within a container connected to the portable fogger body, wherein at least a portion of the quantity of pressurized fogging liquid is dispensable from the container into the mixing chamber;
- an activation switch controlling at least one of activation of the DC blower motor and dispensing of the portion of the quantity of pressurized fogging liquid; and
- a fog, produced when the dispensed portion of the quantity of pressurized fogging liquid is expelled through a nozzle and mixed with the airflow wherein at least 90% of atomized micron particulate of the fog is smaller than 25 microns, wherein the fog exits the mixing chamber at less than 190 CFM and at a velocity of less than 190 MPH.

* * * * *